United States Patent
Dekker et al.

(10) Patent No.: US 9,889,908 B2
(45) Date of Patent: Feb. 13, 2018

(54) SKIDDING SYSTEM FOR AN OFFSHORE INSTALLATION OR VESSEL

(71) Applicant: IHC HOLLAND IE B.V., Sliedrecht (NL)

(72) Inventors: Jacob Pieter Dekker, Ouderkerk aan den IJssel (NL); Everardus Johannes Adrianus Van Leeuwen, Capelle aan den IJssel (NL); Marius Peerdeman, Gorinchem (NL)

(73) Assignee: IHC HOLLAND IE B.V., Sliedrecht (NL)

( * ) Notice: Subject to any disclaimer, the term of this patent is extended or adjusted under 35 U.S.C. 154(b) by 0 days.

(21) Appl. No.: 14/780,905

(22) PCT Filed: Mar. 28, 2014

(86) PCT No.: PCT/NL2014/050195
§ 371 (c)(1),
(2) Date: Sep. 28, 2015

(87) PCT Pub. No.: WO2014/158025
PCT Pub. Date: Oct. 2, 2014

(65) Prior Publication Data
US 2016/0052606 A1  Feb. 25, 2016

(30) Foreign Application Priority Data
Mar. 28, 2013 (NL) ..................... 2010545

(51) Int. Cl.
*B63B 25/28* (2006.01)
*B63B 27/30* (2006.01)
(Continued)

(52) U.S. Cl.
CPC .............. *B63B 25/28* (2013.01); *B63B 27/02* (2013.01); *B63B 27/30* (2013.01); *B63B 35/003* (2013.01);
(Continued)

(58) Field of Classification Search
CPC .... A61K 31/454; A61K 45/06; A61K 31/573; A61K 9/2018; C07D 209/46
See application file for complete search history.

(56) References Cited

U.S. PATENT DOCUMENTS 3,033,525 A    5/1962  Johnson
3,486,737 A *  12/1969 Campbell ............... B66F 1/025
                                               254/106
(Continued)

FOREIGN PATENT DOCUMENTS

CN    101365623 A    2/2009
DE    102008020965    10/2009
(Continued)

OTHER PUBLICATIONS

International Search Report and Written Opinion for corresponding foreign application PCT/NL2014/050195, filed Mar. 28, 2014.
(Continued)

*Primary Examiner* — Jeanette E Chapman
(74) *Attorney, Agent, or Firm* — Steven M. Koehler; Westman, Champlin & Koehler, P.A.

(57) ABSTRACT

The invention relates to a skidding system for an offshore installation or vessel, such as an offshore wind turbine installation ship, comprising at least one set of rails, and one or more carriages for supporting loads and moving the loads along the rails, e.g. from a storage position to an operating position and/or vice versa. At least one of the carriages is adaptable to different loads.

9 Claims, 2 Drawing Sheets

(51) Int. Cl.
  *B63B 27/00* (2006.01)
  *B63B 35/00* (2006.01)
  *B63B 27/10* (2006.01)
  *F03D 13/40* (2016.01)

(52) U.S. Cl.
  CPC .............. *B63B 27/10* (2013.01); *F03D 13/40* (2016.05); *Y02E 10/727* (2013.01)

(56) References Cited

U.S. PATENT DOCUMENTS

| | | | | |
|---|---|---|---|---|
| 3,704,673 A * | 12/1972 | Drelicharz | ......... | B65D 19/0038 108/51.3 |
| 4,063,650 A | 12/1977 | Homer | | |
| 5,044,825 A | 9/1991 | Kaldenbach | | |
| 5,383,630 A * | 1/1995 | Flatten | ................... | B64D 11/06 244/118.6 |
| 5,458,069 A * | 10/1995 | Stolzman | .......... | B29C 66/81431 108/56.3 |
| 6,425,478 B1 * | 7/2002 | Eberle | ................... | B65G 23/16 198/795 |
| 7,806,628 B2 | 10/2010 | Willis | | |
| 2009/0049672 A1 | 2/2009 | Tamamori et al. | | |
| 2009/0199745 A1 * | 8/2009 | Wathne | ................... | B63B 27/00 108/57.15 |
| 2011/0129303 A1 | 6/2011 | Wu et al. | | |
| 2012/0018166 A1 * | 1/2012 | Croatto | ................. | E21B 19/006 166/355 |
| 2012/0240827 A1 * | 9/2012 | Hidalgo | ............. | B65D 19/0095 108/50.11 |
| 2013/0045056 A1 | 2/2013 | Meeuws | | |
| 2014/0069305 A1 * | 3/2014 | Luis y Prado | ..... | B65D 19/0012 108/57.32 |

FOREIGN PATENT DOCUMENTS

| | | |
|---|---|---|
| EP | 2444656 | 4/2012 |
| EP | 2559614 | 2/2013 |
| EP | 2559614 A2 | 2/2013 |
| GB | 2022521 | 12/1979 |
| WO | 2007069081 | 6/2007 |
| WO | 2007069081 A2 | 6/2007 |
| WO | 2010062188 A1 | 6/2010 |
| WO | 2011031148 | 3/2011 |
| WO | 2011031148 A1 | 3/2011 |
| WO | 2011102738 A2 | 8/2011 |

OTHER PUBLICATIONS

Singapore Search Report and Written Opinion for corresponding Appln. No. 11201508029W, dated Sep. 15, 2016, 7 pages.

Chinese Office Action for corresponding Appln. No. 201480024380.0, dated Dec. 23, 2016, 18 pages.

* cited by examiner

SKIDDING SYSTEM FOR AN OFFSHORE INSTALLATION OR VESSEL

CROSS-REFERENCE TO RELATED APPLICATION

The present application is a national stage filing of International patent application Ser. No. PCT/NL2014/050195, filed Mar. 28 2014, and published as WO 2014/158025 A9 in English.

BACKGROUND

The discussion below is merely provided for general background information and is not intended to be used as an aid in determining the scope of the claimed subject matter.

The invention relates to a skidding system for an offshore installation or vessel, such as an offshore wind turbine installation ship (OWTIS), comprising at least one set, e.g. a pair, of rails (also known as skid beams), and one or more carriages (also known as pallets or carts) for supporting loads and moving the loads along the rails, e.g. from a storage position to an operating position, in particular within the reach of a crane to offload the loads from the vessel, and/or vice versa. The invention further relates to a method of skidding loads on an offshore installation or vessel.

As explained in U.S. Pat. No. 3,486,737, when it is desired to move a heavy load on a support in a straight line or in an arc, the moving sometimes is done by skidding the load. For example, when drilling wells from a platform at sea it is customary to skid the drilling rig on the platform from one well location to another. This is commonly done by means of double acting hydraulic cylinders that skid the rig in a series of short steps, between which the pistons are retracted in the cylinders for the next stroke. In the apparatus according to U.S. Pat. No. 3,486,737, a load (6) is slid along a support (3) by a horizontally extendable device (10), a roller (18) being lifted on actuation of the device in one direction to transfer at least some of the load to the roller and thence through a friction shoe (20) to the support.

U.S. Pat. No. 3,033,525 also addresses skidding and relates to a force-transmitting device for moving one member relatively to another.

In modern skidding systems, the handling of loads, such as subsea modules or heavy weight structures (e.g. Xmas trees, process modules, jacket foundations, PLEMs), on open deck demands a high degree of safety for both equipment and personnel. Existing deck skidding systems typically comprise integrated or on-deck skid rails, push-pull, rack and pinion or winch driven carriages. Lay-out and integration with other systems are preferably optimized for efficient deck logistics. For each project, such as a jacket foundation installation project, new skidding carriages to support the loads on the skidding rails of the vessel have to be developed and built.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An aspect of the present invention to provide a more versatile skidding system.

To this end, at least one, preferably a plurality or all, of the carriages is (are) adaptable to different loads, e.g. loads having different footprints such as various jackets for wind turbines.

In an embodiment the carriage or carriages comprise a plurality of supports for a load and at least two of the supports, preferably all, are movable relative to each other.

In a refinement, at least two of the supports are interconnected, directly or indirectly, via at least one telescopic beam. E.g. the carriages comprise skid beams extending lateral to the set of rails and telescopic beams interconnecting the skid beams and extending parallel to the set of rails. Thus, the supports can be moved relative to each other by retracting or extending the telescopic beams.

In another refinement, the carriages comprise a frame and at least one of the supports, preferably a plurality of the supports, are releasably attached to the frame, e.g. bolted, pinned, wedged or welded to the frame.

The skidding system is versatile in that it can be (re-)used in different projects. The embodiments provide an adjustable frame, which can be varied in length and/or width, with the option of relative movement of the supports and/or a plurality of positions for attachment of supports.

In an embodiment, the supports are arranged in a triangle or square, e.g. with the triangles at different (rotational) orientations to facilitate efficient use of deck area.

In another embodiment, which is also useful with non-adaptable carriages, the carriages comprise one or more fasteners for securing the loads to the carriages. The fasteners provide e.g. a friction lock or a positive lock, e.g. by means of a pin or studs that in the locked state of the fastener extend through or in the load. In a refinement, the fasteners are mounted on or integrated in a support or supports.

In another embodiment, the at least one carriage comprises one or more fasteners for securing the carriage or the load to the rails or to an offshore installation or vessel, preferably in vertical direction, in the direction of the rails and transverse to the rails.

By securing the load to the carriage and the carriage to the rails or to an offshore installation or vessel, the load is sea-fastened to the installation or vessel.

The skidding system is especially suitable to be fixed to, e.g. welded to or integrated in, the deck of an offshore installation or vessel.

The invention also relates to a method of skidding loads on (deck of) an offshore installation or vessel, such as an offshore wind turbine installation ship (OWTIS), comprising at least one set of rails, and one or more carriages for supporting loads and positioned on the rails. The method comprises the steps of selecting the load(s) to be skidded, adapting the carriage(s) to the load(s), and positioning the load(s) on the adapted carriage(s).

In an embodiment, the at least one carriage comprises a plurality of supports and the method comprises the step of repositioning at least two of the supports relative to each other.

In another embodiment, the carriage comprises a frame and at least one of the supports is releasably attached to the frame and the method comprises the step of removing at least one of the supports from the frame and re-attaching the support to the frame at a different location.

In another embodiment, the method comprises fastening the load(s) to the carriage(s).

Yet another embodiment comprises moving the carriages and the loads along the rails from storage positions to an operating position (such as a crane). In a refinement, the loads are removed from the carriages and the footprint of at least one of the carriages reducing after its load has been removed, e.g. by retracting telescopic beams (if present).

BRIEF DESCRIPTION OF THE DRAWINGS

Aspects of the invention will now be explained in more detail with reference to the drawings, which schematically show embodiments of the skidding system.

DETAILED DESCRIPTION OF THE ILLUSTRATIVE EMBODIMENT

Figure 1:
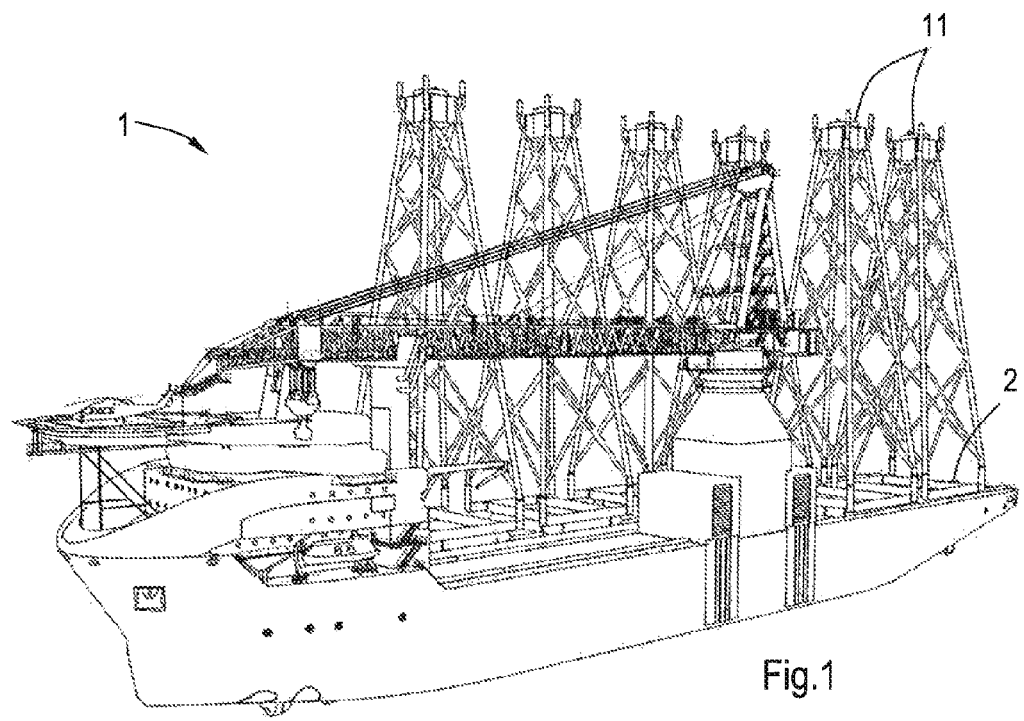
FIG. 1 is a perspective view of an offshore wind turbine installation ship (OWTIS) comprising a deck skidding system.

FIG. 1 shows an offshore wind turbine installation ship (OWTIS) 1 provided with a deck skidding system 2 and a crane 3 for on and off loading loads, such as subsea modules or heavy weight structures 4. The skidding system comprises two sets of rails 5 extending in the longitudinal direction of the ship, a first set 5A extending alongside the crane 3 and a second set 5B juxtaposed to the first set and extending up to the crane. A plurality of skidding carriages 6, also known as e.g. pallets or carts, are supported on the rails 5 and in turn support loads, e.g. jacket foundations 4 for wind turbines.

Figure 2:
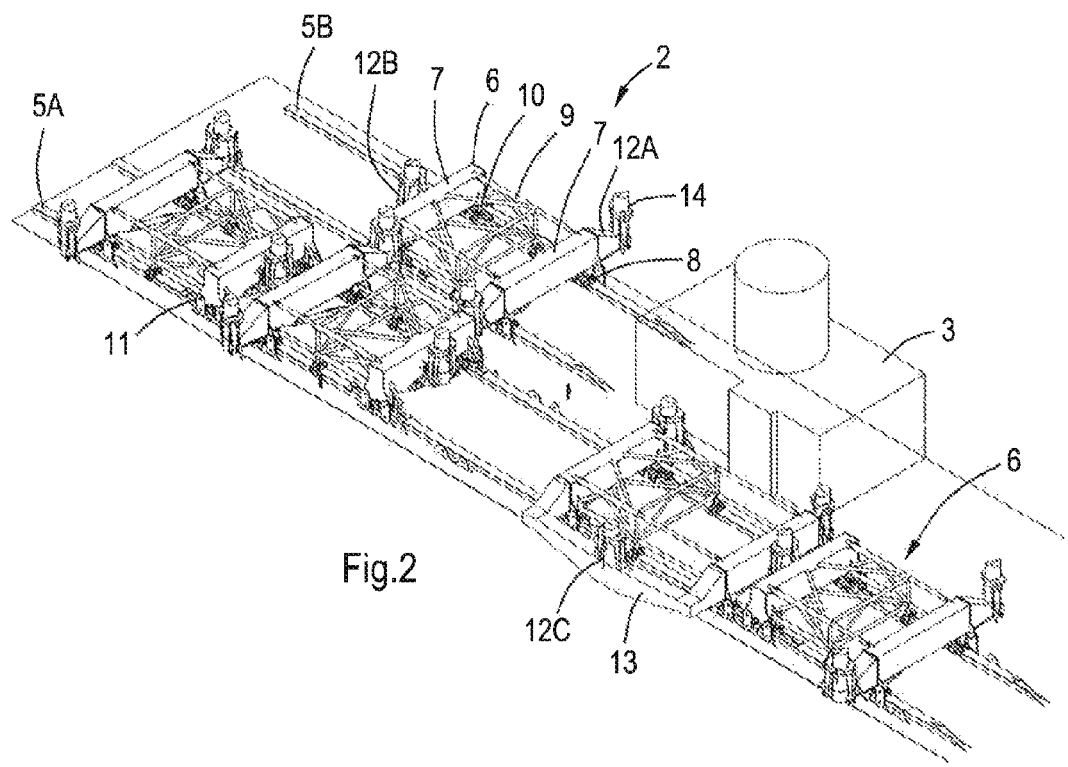
FIG. 2 is a perspective view of a deck skidding system according to the present invention comprising differently configured carriages.
Figure 3:
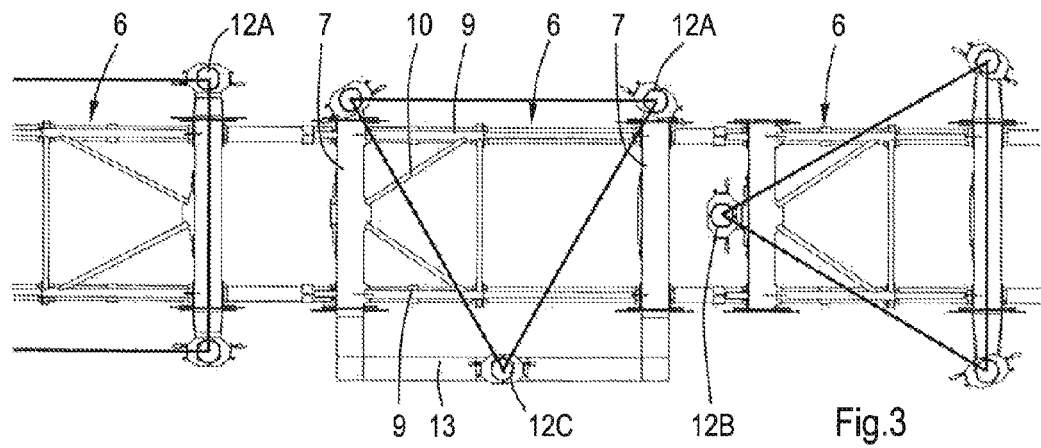
FIG. 3 is a top view of another deck skidding system.

As shown in FIGS. 2 and 3, the carriages 6 comprise a pair of structural (skid) beams 7, e.g. having a rectangular hollow cross-section and extending in a direction transverse to the rails 5 and supported by skid shoes 8 (see also FIG. 5) resting on the rails 5. The skid beams 7 are interconnected via telescopic beams 9, e.g. extending parallel to the rails, and a truss 10 reinforcing the connection between one of the skid beams and the cylinder ends of the telescopic beams. The skid beams, telescopic beams and trusses together form a frame. Further, the carriages are provided, in a manner known in itself, with hydraulic push-pull units 11 to skid the carriages 6 along the rails 5.

The ends of the skid beams 7 provide discrete positions locations for supports 12, which are bolted to the positions. In this example, the system comprises three types of supports: supports (ears) 12A releasably attached to an end of a skid beam 7, supports 12B releasably attached to a middle portion a skid beam 7, and supports 12C comprising an additional beam 13 connected ends of two skid beams 7. All three types provide support for one leg of a load, such as a jacket foundation. Other examples of supports include supports for two or more legs of a load and supports positioned in or near the middle of the carriage 6.

The examples above provide an adjustable frame, which can be varied in length and/or width, with a plurality of positions for attachment of supports. Thus, the carriages can be adapted to a large number of different footprints and orientations, e.g. triangular footprints with the triangles in different (rotational) orientations to facilitate efficient use of deck area. This is illustrated in FIG. 2, which shows two juxtaposed carriages with identical triangular footprint but opposite orientations, i.e. rotated relative to each other over 180°. FIG. 3 shows a carriage having a square footprint and two carriages having a triangular footprint but rotated relative to each other over 90°.

Figure 4:
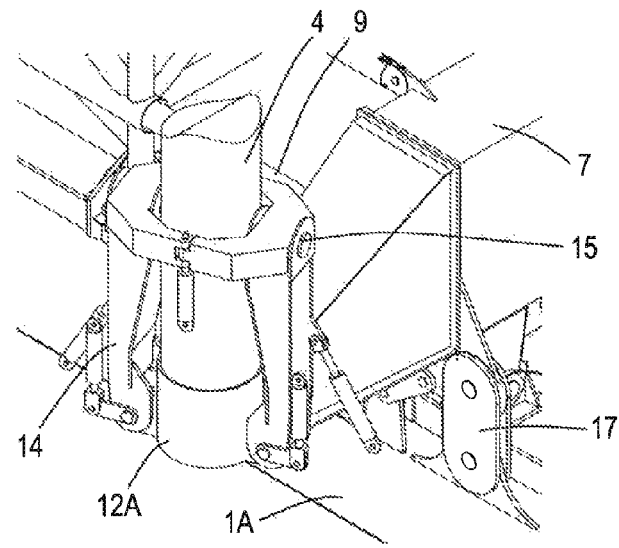
FIG. 4 is a perspective view of a fastener for securing a load to a carriage.

As shown in FIG. 4, each of the supports comprises a fastener, e.g. a gripper 14, for securing the load 4 to the carriage 6. In this example, each of the fasteners comprises a pin 15 extending through a leg of a jacket providing a positive lock between the leg and the fastener.

Figure 5:
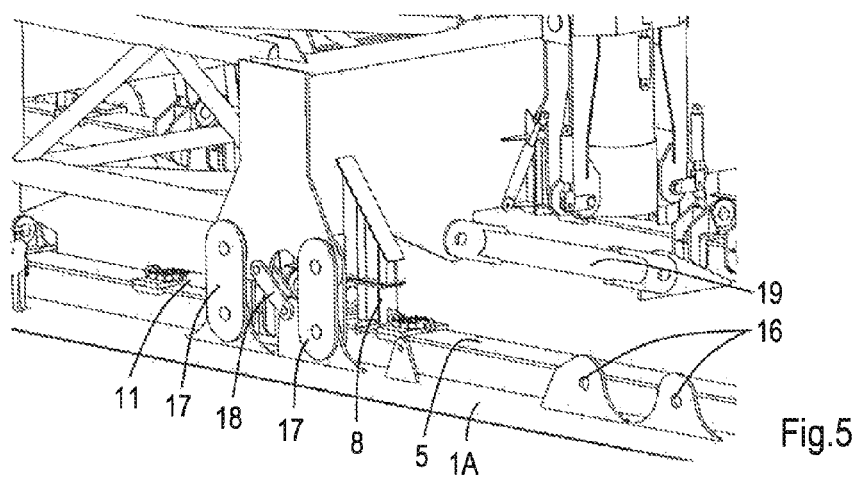
FIG. 5 is a perspective view of a fastener for securing a carriage to the deck of a ship.

Further, as shown in FIG. 5, the carriages 6 comprise fasteners for securing the carriage to the deck 1A of the ship. In this example, the fasteners secure the carriage in all three degrees of freedom: a first set of eyes 16 on the deck 1A and on the carriage and links 17 joining the eyes, thus providing a secure connection in the vertical direction, a second set of eyes on the carriage 6 and on the deck, offset in the direction of the rails and a diagonal link 18 joining the eyes, thus providing a secure connection in a horizontal direction parallel to the rails 5, and a third set of eyes on the carriage and on the deck, offset in a direction transverse to that of the rails and a diagonal link 19 joining the eyes, thus providing a secure connection in a horizontal direction transverse to the rails.

The invention is not restricted to the above-described embodiments, which can be varied in a number of ways within the scope of the claims. In an example, the supports can also be slidingly attached to the carriages, enabling repositioning by unlocking the supports, sliding the supports to a new position e.g. along a beam of or a rail on the carriage, and again locking the supports to the carriage at the new position.

The invention claimed is:

1. A skidding system for an offshore installation or vessel, comprising at least one set of rails, and one or more carriages, each carriage configured to support a load and move the load along the rails, wherein:
   at least one of the carriages is configurable to different loads,
   the at least one carriage comprises a plurality of supports supporting the load, and
   at least two of the supports are movable relative to each other.

2. The skidding system according to claim 1, wherein at least two of the supports are interconnected, directly or indirectly, via at least one telescopic beam.

3. The skidding system according to claim 1, wherein the carriage comprises a frame and at least one of the supports is releasably attached to the frame.

4. The skidding system according to claim 3, wherein at least one of the supports is bolted to the frame.

5. The skidding system according to claim 1, wherein the supports are arranged in a triangle or square.

6. The skidding system according to claim 1, wherein the at least one carriage comprises one or more fasteners configured to secure an associated load to the at least one carriage.

7. The skidding system according to claim 6, the one or more fasteners being mounted on or integrated in a support or supports.

8. The skidding system according to claim 1, wherein the at least one carriage comprises one or more fasteners configured to secure the at least one carriage or an associated load to the rails or to a deck of an offshore installation or vessel.

9. The skidding system according to claim 1, wherein the skidding system is fixed to a deck of an offshore installation or vessel.

* * * * *